(12) United States Patent
Xiang et al.

(10) Patent No.: US 10,735,305 B2
(45) Date of Patent: Aug. 4, 2020

(54) COMMUNICATION LOCALITY ORIENTED HIGH-RADIX INTERCONNECTION NETWORK AND ADAPTIVE ROUTING ALGORITHM DESIGN

(71) Applicant: Tsinghua University, Beijing (CN)

(72) Inventors: Dong Xiang, Beijing (CN); Yuan Cai, Beijing (CN); Xiaowen Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/838,845

(22) Filed: Dec. 12, 2017

(65) Prior Publication Data

US 2018/0183703 A1 Jun. 28, 2018

(30) Foreign Application Priority Data

Dec. 12, 2016 (CN) .......................... 2016 1 1139920

(51) Int. Cl.
| | |
|---|---|
| *H04L 12/715* | (2013.01) |
| *H04L 12/733* | (2013.01) |
| *H04L 12/933* | (2013.01) |
| *H04L 12/947* | (2013.01) |
| *H04L 12/801* | (2013.01) |

(52) U.S. Cl.
CPC ............ *H04L 45/04* (2013.01); *H04L 45/122* (2013.01); *H04L 45/20* (2013.01); *H04L 47/10* (2013.01); *H04L 49/15* (2013.01); *H04L 49/25* (2013.01); *Y02D 50/30* (2018.01)

(58) Field of Classification Search
CPC .. H04L 45/04; H04L 49/1515; H04L 49/1569
USPC ......................................... 370/401, 400, 351
See application file for complete search history.

(56) References Cited

U.S. PATENT DOCUMENTS

| | | | |
|---|---|---|---|
| 2013/0108259 A1* | 5/2013 | Srinivas ............... | H04Q 3/0083 398/25 |
| 2014/0314099 A1* | 10/2014 | Dress ..................... | H04L 45/62 370/422 |

* cited by examiner

*Primary Examiner* — Jeffrey M Rutkowski
*Assistant Examiner* — Sudesh M Patidar
(74) *Attorney, Agent, or Firm* — Umberg Zipser LLP

(57) ABSTRACT

This invention proposes a new communication locality oriented high-radix (CLHR) network. In this hierarchical architecture, the lowest level includes routers or servers, called level-0; the upper level is composed by groups of routers or servers, called level-1; for the highest level, a number of level-(l−1) groups establish level-1 group. A new deadlock-free adaptive routing algorithm is proposed for the CLHR network. On the one hand, the proposed minus-first routing (MFR) algorithm or plus-first routing algorithm, that implements deadlock-free partially-adaptive routing without any virtual channel, can guarantee the number of communication hops between two nodes is no more than five. On the other hand, this invention presents the fully adaptive routing algorithm that uses MFR algorithm as the baseline routing using a new flow control scheme. The CLHR network and the new routing algorithm effectively improve the performance, save energy, improve the ability for separation, and resist disturbance.

6 Claims, 10 Drawing Sheets

COMMUNICATION LOCALITY ORIENTED HIGH-RADIX INTERCONNECTION NETWORK AND ADAPTIVE ROUTING ALGORITHM DESIGN

TECHNICAL FIELD

This invention relates to distributed computing technique, especially related to an interconnection network and adaptive routing algorithm.

BACKGROUND

Interconnection network implements communication and synchronization among different processors, which are critical to connect processors, memories, I/O devices. Interconnection network is important to performance and scalability of a high-performance computer system. How to provide low latency and efficient communication among processors based on existing technology is a key problem to be solved urgently.

The development of microprocessor technology improves the computational power of a single processor, so that a higher request to the performance of interconnection network has been set. In fact, there is a 30% gap between growth of interconnection network bandwidth and growth of microprocessor performance. Therefore, latency and bandwidth of an interconnection network have been the bottlenecks to improve the performance of a high-performance computer system.

Along with development of semiconductor technology and progress of circuit technology, serial communication has been an efficient signal transmission mode. The use of high-speed serial channel can significantly improve pin bandwidth, thereby reduce the number of pin. In early 1990s, router pin bandwidth is limited in 10 Gbps. Entering 21st century, pin bandwidth can reach 10~20 Tbps. Advances in these technology and high-radix router is possible.

The high-radix router has been development trends of interconnection network. The interconnection network, which is composed of high-radix routers, can connect tens of thousands of routers by a few hops. In addition, high-radix networks can reduce network diameter, implement efficient communication between processors, reduce message latency and design cost, and improve system performance.

In 2006, Cray Blackwidow computer firstly utilizes 64-radix router chip, which interconnects 32000 processors by Clos network and can assure distance between two processors is not more than 7 hops. In 2012, Cray Cascade system utilizes 48-radix router chip. It interconnects 370216 processors by Dragonfly network, and it can assure the distance between two processors is not more than 5 hops. However, four virtual channels are required to provide deadlock-free adaptive routing.

However, how to design efficient interconnection topology and efficient routing algorithm based on existing chip technology and high-radix router technology is a key research subject to be solved urgently. Although Blackwidow Clos utilizes high-radix router, cost is high and diameter is large, which affect the system performance. Cascade Dragonfly network also utilizes high-radix router and it has high scalability, low cost, small diameter. But it needs four virtual channels to avoid deadlock which increases design complexity and route latency, limiting the system performance.

In addition, communication locality is a very good feature in an interconnection network, which can effectively improve performance and save energy. The communication locality oriented high-radix network and the new routing algorithm provide this feature.

SUMMARY

I. Technical Problem

This invention should solve the problem is: providing an interconnection network that based on router label and an adaptive routing algorithm. This interconnection network not only remains the low cost and high scalability features that the original Dragonfly network has, but also reduces the number of global connections in the same network scale. Meanwhile routing algorithm can implement deadlock-free partially or completely adaptive routing without any virtual channels. In addition, the new interconnection network and the new routing algorithm provide communication locality.

II. Technical Proposal

In order to solve above problem, this invention proposes an interconnection network. The proposed system is the hierarchical network architecture which has four-layer. The lowest level includes a series of routers that connect to one or more processors or servers; a series of nodes establish a row, and each router group has at least two rows; a cluster contains a couple of groups; and the whole system is made up of a number of clusters;

The interconnection network contains p clusters, and each cluster contains q groups. Each group contains g routers that are placed in m rows and each row contains n routers, p is an integer greater than or equal to 2, q is an integer greater than or equal to 2, n is an integer greater than or equal to 1, m is an integer greater than or equal to 2, g is an integer greater than or equal to 2;

The interconnection network labels clusters as $G_0$, $G_1$, ... $G_{p-1}$ from left to right; labels the groups as $G_{0,i}$, $G_{1,i}$, ..., $G_{q-1,i}$ from top to bottom in the cluster $G_i$; labels the routers as $R_0$, $R_1$, ..., $R_{n-1}$, ..., $R_{mn-1}$ from left to right and top to bottom in a group;

The interconnection network, is characterized in that, has the following rule to connect the routers of each group:
  Rule1: Any two nodes in the same row are connected;
  Rule2: Any two nodes in the same column are connected;
  Rule3: For any adjacent row from first to last, the last node of the first row is connected to the first node of the next row;

The rule to connect the groups of each cluster by using group-level (GL) global links:
  Rule 1: For $i \in \{0, 1, 2, \ldots, q-2\}$, the last router $R_{mn-1} \in G_{i,a}$ is connected to the first router $R_0 \in G_{i+1,a}$, where a is a cluster label;
  Rule2: After any pairs of adjacent groups have been connected, any pairs of non-adjacent groups are connected by the following way. As the principle to connect $G_{i,a}$ to all $G_{j,a}$ with j>i for i=0 to q−3 and j=i+2 to q−1, connecting the highest available global slot in $G_{i,a}$ to the lowest available slot in $G_{j,a}$;

The rule to connect clusters by using cluster-level (CL) global links:
  Rule1: The last router $R_{mn-1}$ in the last group $G_{q-1,a}$ of current cluster $G_a$ is connected to the first router $R_0$ in the first group $G_{0,a+1}$ of next cluster $G_{a+1}$ for a=0 to p−2;

Rule2: Connect $G_{i,a} \in G_a$ via the lowest available slot in $G_{i,a}$ to the highest available slot in $G_k$ with $a>k$ for $a=1$ to $p-1$, $k=0$ to $a-1$, $i=0$ to $q-1$. There are k global links from a group in $G_a$ to k separate groups in $G_k$, and the difference of the CL global links number connected to routers in the same group in $G_k$ and any pair of groups in cluster $G_k$ is no more than one;

A partially-adaptive routing algorithm for a Communication Locality High-Radix (CLHR) network includes following steps:

S1: The clusters are labeled as $G_0, G_1, \ldots, G_{p-1}$ from left to right; the groups are labeled as $G_{0,i}, G_{1,i}, \ldots G_{q-1,i}$ from top to bottom in the cluster $G_i$; the routers are labeled as $R_0, R_1, \ldots, R_{n-1}$, from left to right and top to bottom in a group. Above elaborates the connection rule;

S2: According to labels of routers, or groups, or clusters at both ends of the channel, a hop can be classified as minus or plus. A hop is minus if the label of its source is greater than the destination; otherwise, the hop is plus;

S3: The routing scheme allows one or more minus hops first and then one or more plus hops after that, namely minus-first routing; or one or more plus first and one or more minus hops after that, namely plus-first routing;

The partially-adaptive routing algorithm of interconnection network classifies a hop as minus or plus that should obey principles as follows:

Let a hop from $R_c \in G_{b,a}$ to $R_f \in G_{e,d}$,
if $a>d$, the hop is minus;
if $a<d$, the hop is plus;
if $a=d$ and $b>e$, the hop is minus;
if $a=d$ and $b<e$, the hop is plus;
if $a=d$ and $b=e$ and $c>f$, the hop is minus;
if $a=d$ and $b=e$ and $c<f$, the hop is plus;

The partially-adaptive routing algorithm of interconnection network obeys minus-first rule (MFR) when forwarding packets in the step S3.

Stated step S3 which contains following steps:

S31: Assume that current node is $G_a G_{b,a} R_c$, destination is $G_d G_{e,d} R_f$. The MFR algorithm checks whether the current node and the destination node are in the same cluster. If $a=d$, then step into S32; otherwise, step into S33;

S32: This step checks whether current node and destination node are in the same group. If $b=e$, then step into S321; if $b<e$, then step into S322; otherwise, step into S323;

S321: This step checks whether c is equal to f. If $c=f$, packet has arrived at destination, finish; if $c\neq f$, then deliver the packet from c to f by a local link directly;

S322: Assume that $R_v \in G_{b,a}$ is connected to $R_{v'} \in G_{e,d}$ by a GL global link. If $f=v'$, then the packet can be delivered from $R_c$ to $R_v$ first via a plus or minus hop, and from $R_v$ to $R_{v'}$ by a plus hop, which conforms to the MFR scheme; if $f>v'$, then the packet can be delivered along MFR hops, which is similar to above case; if $f<v'$, then the packet need be misrouted to $G_{k,a}$. Assume that $R_{v1} \in G_{b,a}$ is connected to $R_{v'1} \in G_{k,a}$ and $R_{v2} \in G_{k,a}$ is connected to $R_{v2} \in G_{e,d}$, the packet is misrouted to $G_{k,a}$ with $b<k<e$, where $R_{v'1}<R_{v'2}$ and $R_f>R_{v2}$;

S323: Assume that $R_v \in G_{b,a}$ is connected to $R_{v'} \in G_{e,d}$ by a GL global link. If $c=v$, then the packet can be delivered from $R_c$ to $R_{v'}$ first via a minus hop, and from $R_{v'}$ to $R_f$ by a minus or plus hop, which conforms to the MFR scheme; if $c>v$, then the packet can be delivered along MFR hops, which is similar to above case; if $c<v$, then the packet need be misrouted to $G_{k,a}$. Assume that $R_{v1} \in G_{b,a}$ is connected to $R_{v2} \in G_{k,a}$ and $R_{v'1} \in G_{k,a}$ is connected to $R_{v2} \in G_{e,d}$, the packet is misrouted to $G_{k,a}$ with $e<k<b$, where $R_{v'1}<R_{v'2}$ and $v1 \leq c$; the packet is misrouted to $G_{k,a}$ with $k<e<b$, where $v1 \leq c$ and $v2 \leq f$;

S33: This step checks whether the group $G_{b,a}$ that contains current node is directly connected to the group $G_{e,d}$ that contains destination node. If so, then step into S331; otherwise, step into S332;

S331: Assume that $R_v \in G_{b,a}$ is connected to $R_{v'} \in G_{e,d}$ by a CL global link. The packet can be delivered to the destination along minimum path as if a minimum MFR path is available. If there is not an available MFR path in the above case, the packet can be misrouted to one of the 2k−2 groups, along which a MFR path is available. Among the 2k−2 groups, the k−1 groups in $G_a$ that are connected to $G_{e,d}$, and the k−1 groups in $G_d$ that are connected to $G_{b,a}$;

S332: Find the k groups in $G_a$ that are connected to $G_{e,d}$, and the k groups in $G_d$ that are connected to $G_{b,a}$. The packet is delivered to one of the 2k groups, through which an MFR path can be found from current node to the intermediate group, and finally to the destination;

S34: If above steps don't find an available MFR path, then select an adaptive intermediate group. If $a<d$ and $e>0$, then select $G_{e-1,d}$ as an intermediate group. If $a>d$ and $b>0$, then select $G_{b-1,a}$ as an intermediate group. If $a<d$ and $e=0$, then select $G_{q-1,d-1}$ as an intermediate group. If $a>d$ and $b=0$, then select $G_{q-1,a-1}$ as an intermediate group;

An adaptive routing algorithm for CLHR contains following steps:

D1: The method classifies packets as safe or unsafe: A safe packet is one that is delivered to the current router via a hop that conforms to MFR, which can reach the destination via MFR hops; otherwise, the packet is unsafe;

D2: Each input port contains buff buffers, where each buffer is enough to keep the whole packet, where buff is an integer greater than or equal to 2;

D3: Let current node is $G_a G_{b,a} R_c$, and destination node is $G_d G_{e,d} R_f$. This method checks whether cluster a is the same as cluster d. If $a=d$, step into D31; otherwise, step into D32;

D31: If $b=e$ and routing satisfies flow control conditions, then deliver the packet from current node to destination via row-first or column-first minimum path routing; if $b<e$, then step into D311; otherwise, step into D312;

D311: Assume that $R_v \in G_{b,a}$ is connected to $R_{v'} \in G_{e,d}$ by a GL global link. If $R_f<R_{v'}$, $R_c \neq R_v$, and routing satisfies flow control conditions, then deliver the packet to the next router as unsafe packet; if $R_f \leq R_{v'}$ and routing satisfies flow control conditions, then deliver the packet to the next router as safe packet;

D312: Assume that $R_v \in G_{b,a}$ is connected to $R_{v'} \in G_{e,d}$ by a GL global link. If $R_c<R_v$ and routing satisfies flow control conditions, then deliver the packet to the next router as unsafe packet; if $R_c \geq R_v$ and routing satisfies flow control conditions, then deliver the packet to the next router as safe packet;

D32: When both the current and destination groups are directly connected, the packet is delivered to the k−1 other groups in $G_a$ that are connected to $G_{e,d}$, or other k−1 groups in $G_d$ that are connected to $G_{b,a}$. The method takes priority to selecting paths that the packet is safe when injecting the input port of the next hop. If the current and destination groups are not directly connected, the method finds the k intermediate groups in $G_d$ that are connected to the current group, and the k groups in $G_a$ that are connected to the destination group. The packet is delivered to one of the 2k groups along which the packet becomes safe as early as possible provided that the flow control conditions can be satisfied;

D4: Assume that the number of free buffer is f and the number of safe packets is s at the next router. The adaptive routing can forward a packet to the next hop if one of the following conditions can be satisfied:

if f>1, packet can be delivered to the next hop via provided channel;

if f=1 and s≥1, packet can be delivered to the next hop via provided channel;

if f=1, s=0, and the next hop conforms to MFR scheme, packet can be delivered to the next hop via the provided channel;

Otherwise, the packet cannot be delivered to the next hop via the provided channel;

Above is flow control scheme which is stated in the D3.

III. Beneficial Effects

This invention proposes a new interconnection network not only remains the low cost and high scalability features that the original Dragonfly network has, but also reduces the number of global connections in the same network scale. Meanwhile this network topology is conductive to implement adaptive routing.

The proposed minus-first routing algorithm or plus-first routing algorithm, which implements deadlock-free partially-adaptive routing without any virtual channel, can guarantee the number of communication hops between two nodes no more than five. This routing algorithm can avoid virtual channel allocation scheme because it doesn't depend on virtual channels. Thus it reduces design complexity of router, message latency, and improves throughput, system performance. Eventually, this invention presents the adaptive routing algorithm that uses MFR algorithm as the baseline routing based on a new flow control scheme. This adaptive routing allows packets to reach destination by minimum path, thus improve utilization rate of channel and throughput. In addition, the flow control adapts to all VCT-switch network.

DETAILED DESCRIPTION

Now detailed explanation for this invention will be given as follows, together with the attached illustration and implemented examples.

Figure 1:
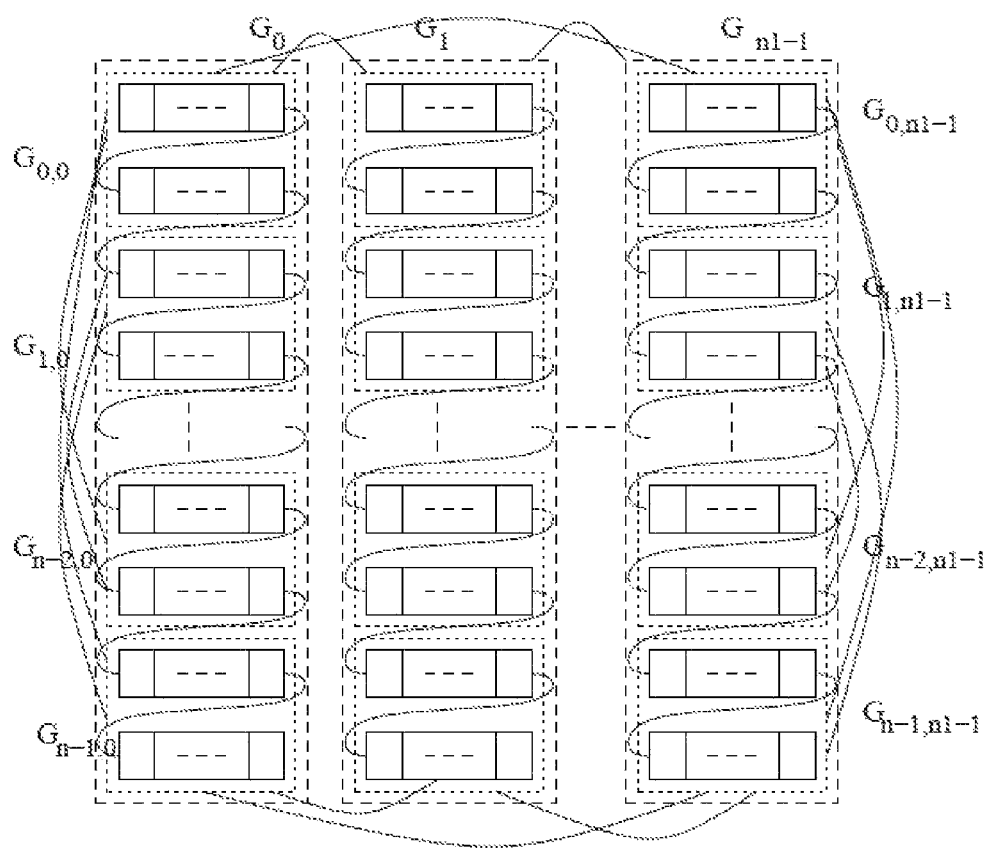
FIG. 1 is a structure schematic view of the interconnection network for embodiment of the invention.
Figure 2A:
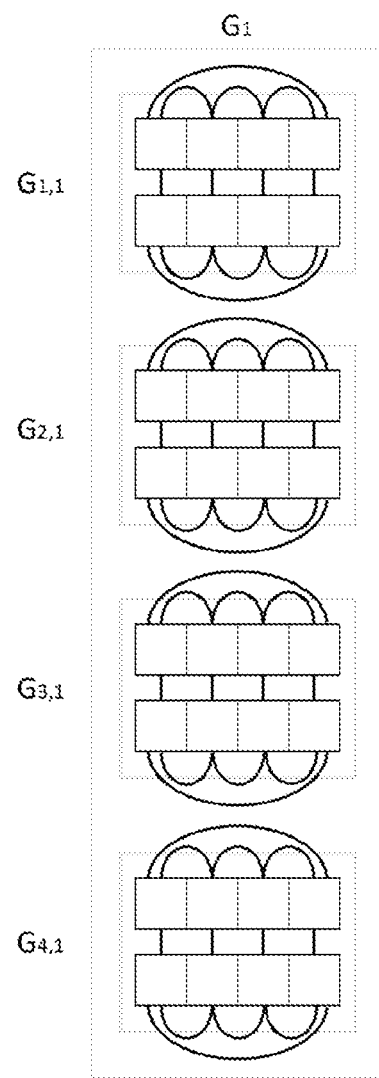
FIG. 2A is an intra-group connection schematic view of the interconnection network for embodiment of the invention.
Figure 2B:
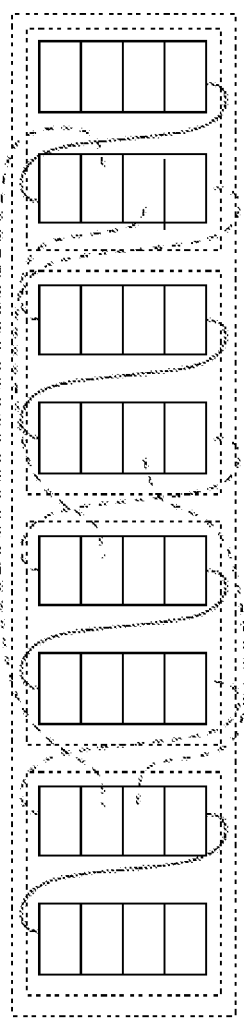
FIG. 2B is an inter-group connection schematic view of the interconnection network for embodiment of the invention.
Figure 2C:
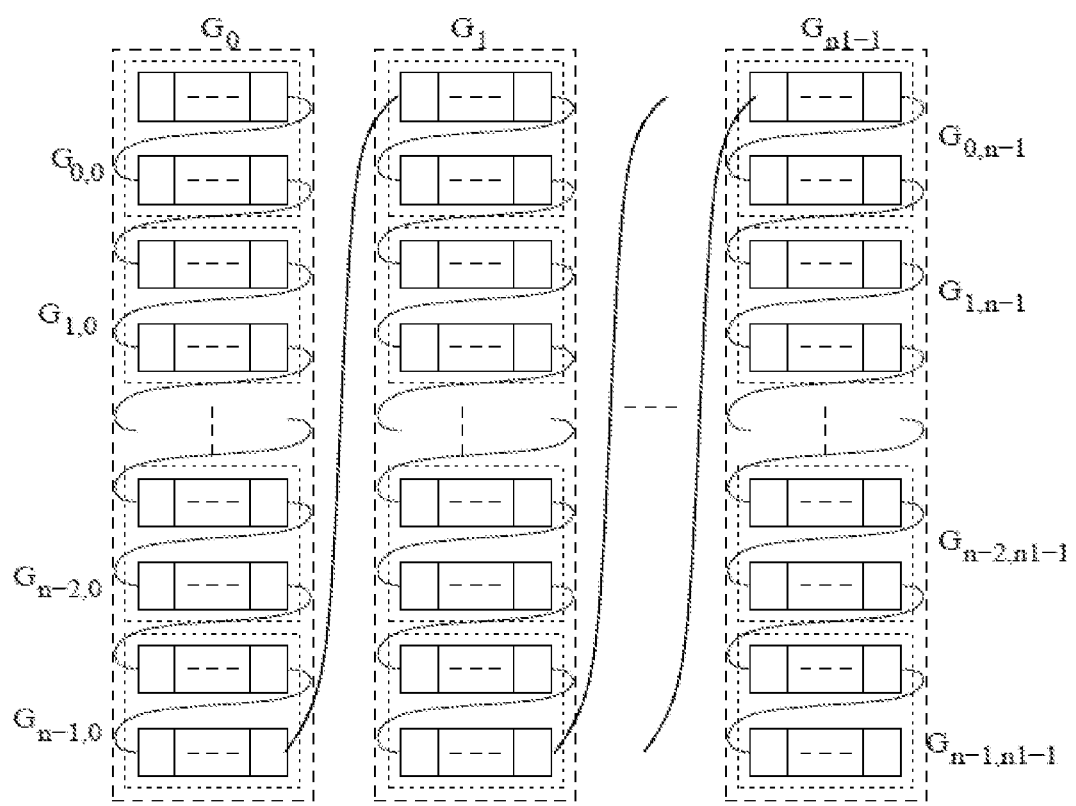
FIG. 2C is an adjacent-cluster connection schematic view of the interconnection network for embodiment of the invention.
Figure 2D:
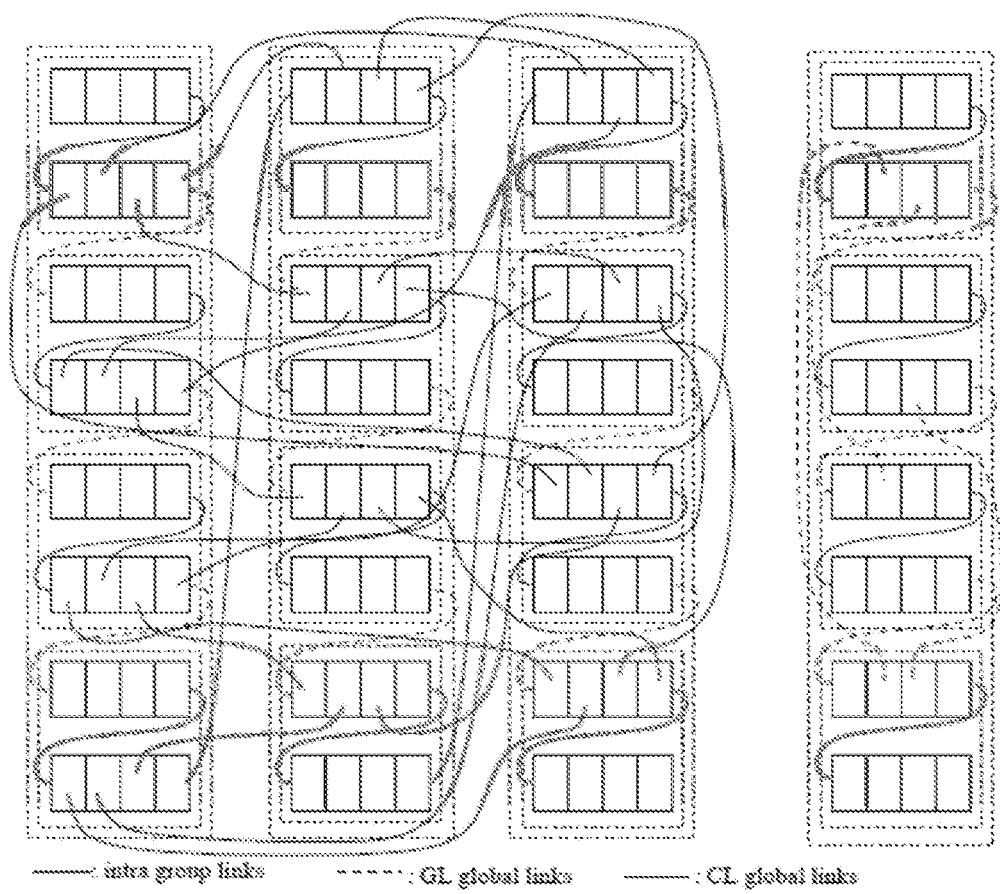
FIG. 2D is an inter-cluster connection schematic view of the interconnection network for embodiment of the invention.
Figure 3A:
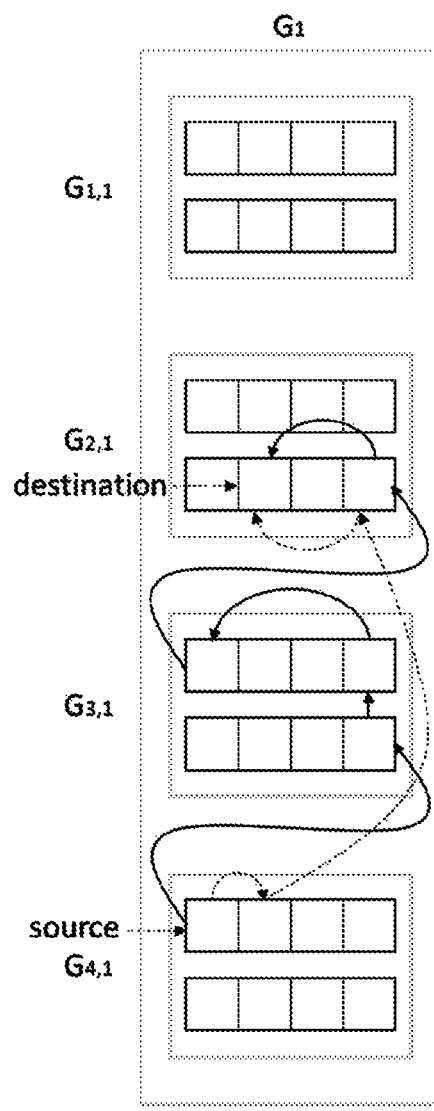
FIG. 3A is a hop schematic view of the deadlock-free adaptive routing algorithm for embodiment of the invention when source and destination are in the same cluster.
Figure 3B:
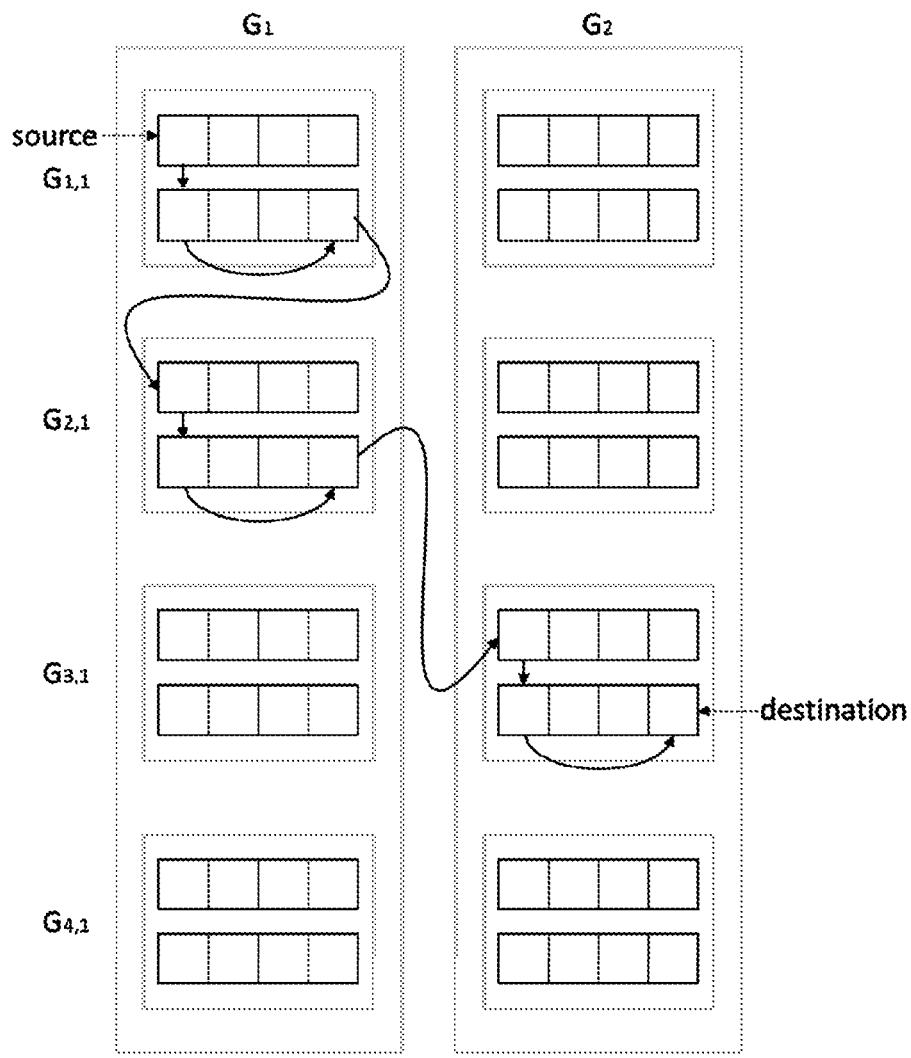
FIG. 3B is a hop schematic view of the deadlock-free adaptive routing algorithm for embodiment of the invention when source and destination are in the adjacent cluster.
Figure 3C:
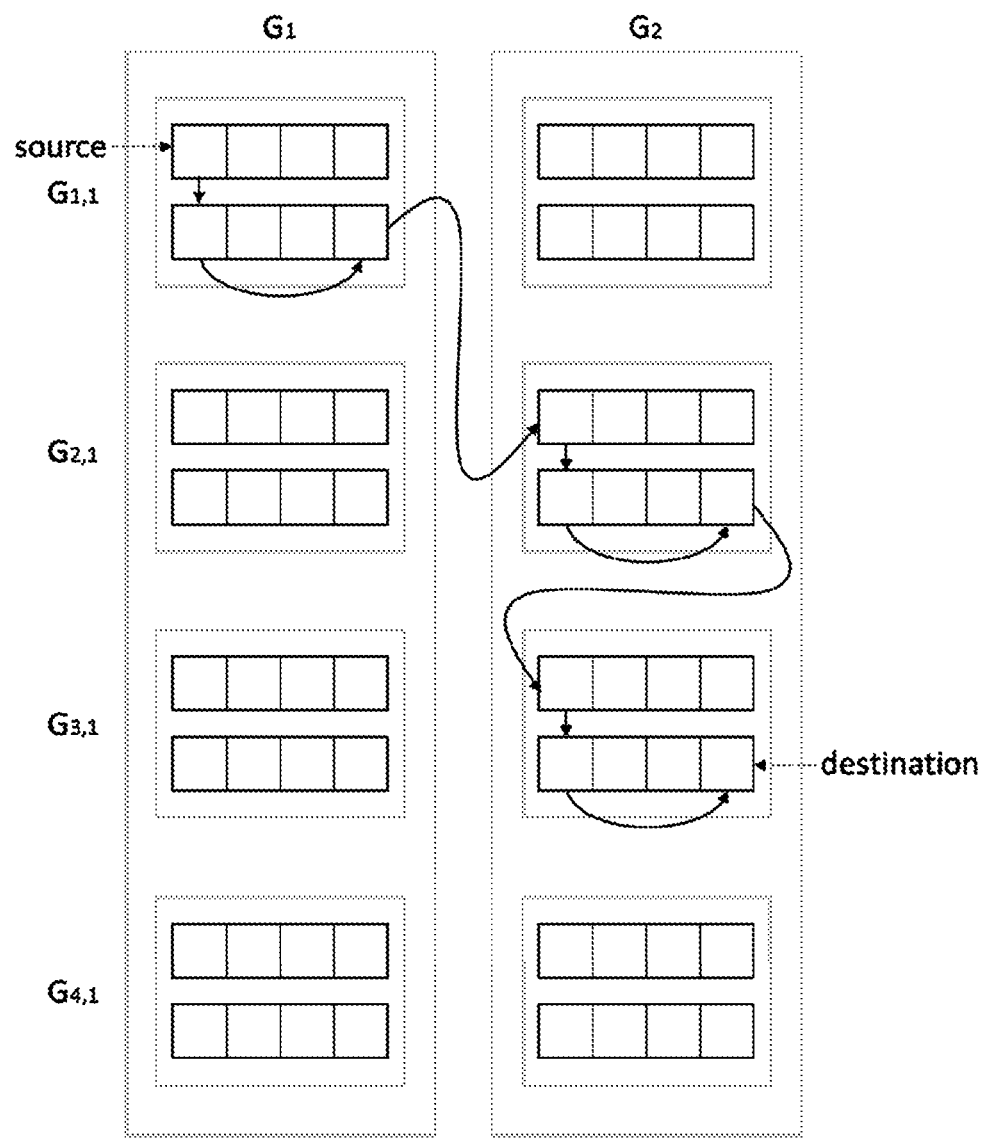
FIG. 3C is a hop schematic view of the deadlock-free adaptive routing algorithm for embodiment of the invention when source and destination are in the adjacent cluster.
Figure 3D:
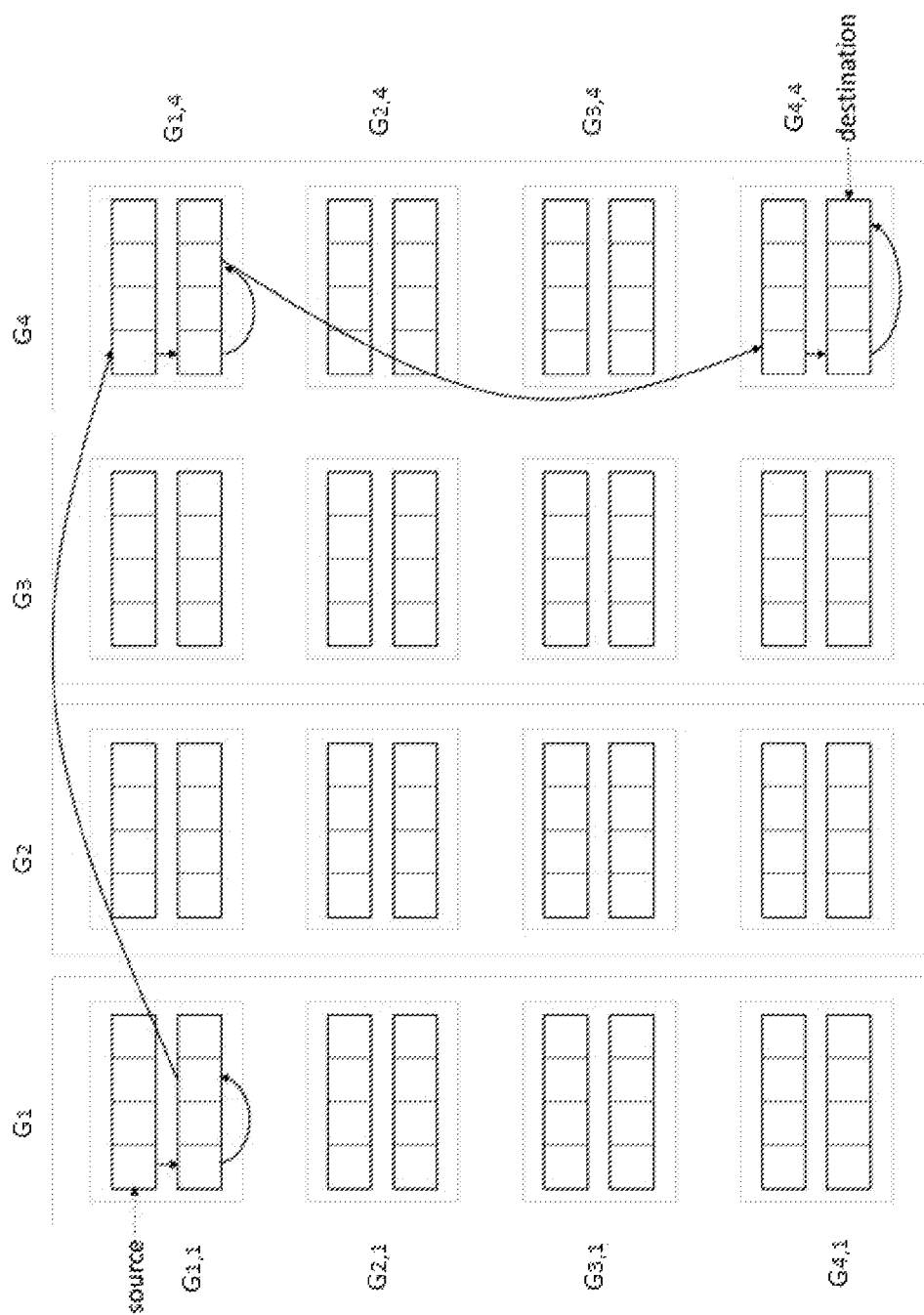
FIG. 3D is a hop schematic view of the deadlock-free adaptive routing algorithm for embodiment of the invention when source and destination are in the non-adjacent cluster.
Figure 3E:
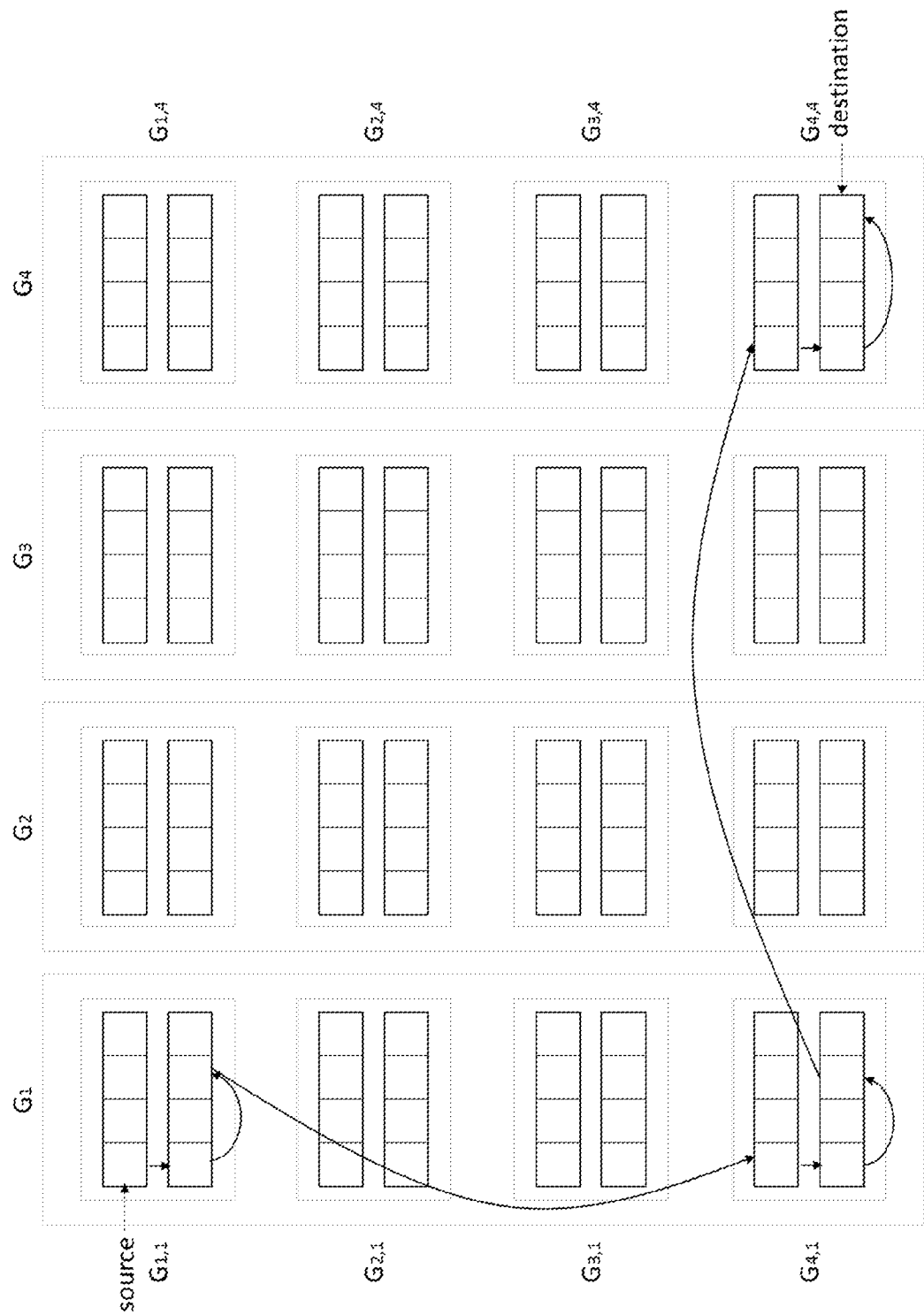
FIG. 3E is a hop schematic view of the deadlock-free adaptive routing algorithm for embodiment of the invention when source and destination are in the non-adjacent cluster.

The proposed interconnection network, is characterized in that, is the hierarchical network architecture which has four-layer as shown in FIG. 1. The lowest level includes a series of routers that connect to one or more processors or servers; a series of nodes establish a row, and each router group has at least two rows; a cluster contains a couple of groups; and the whole system is made up of a number of clusters;

In order to neatness of network and convenience of routing algorithm, let the interconnection network contain p clusters, and each cluster contains q groups. Each group contains g routers that are placed in m rows and each row contains n routers, where p, q, n, m, and g are integers greater than or equal to 2;

FIGS. 2A-2D present the interconnection network for embodiment of the invention. In this interconnection network, p=4, q=4, m=2, and n=4. Any two routers in the same row are connected by a local link, while any two routers in the same column in the same group are connected by a local link. Any two groups in the same cluster are connected by a group-level global link. There are some cluster-level global links between the clusters. The detailed connection rules will be given as follows:

The rule to connect the routers in the same group:

Rule 1: Any two nodes in the same row are connected;

Rule2: Any two nodes in the same column are connected;

Rule3: For any adjacent row from first to last, the last node of the first row is connected to the first node of the next row;

The rule to connect the groups of each cluster by using group-level (GL) global links:

Rule 1: For i∈{0, 1, 2, . . . , q−2}, the last router $R_{mn-1} \in G_{i,a}$ is connected to the first router $R_0 \in G_{i+1,a}$, where a is a cluster label;

Rule2: After any pairs of adjacent groups have been connected, any pairs of non-adjacent groups are connected by the following way. As the principle to connect $G_{i,a}$ to all $G_{j,a}$ with j>i for i=0 to q−3 and j=i+2 to q−1, connecting the highest available global slot in $G_{i,a}$ to the lowest available slot in $G_{j,a}$;

The rule to connect clusters by using cluster-level (CL) global links:

Rule1: The last router $R_{mn-1}$ in the last group $G_{q-1,a}$ of current cluster $G_a$ is connected to the first router $R_0$ in the first group $G_{0,a+1}$ of next cluster $G_{a+1}$ for a=0 to p−2;

Rule2: Connect $G_{i,a} \in G_a$ via the lowest available slot in $G_{i,a}$ to the highest available slot in $G_k$ with a>k for a=1 to p−1, k=0 to a−1, l=0 to q−1. There are k global links from a group in $G_a$ to k separate groups in $G_k$, and the difference of the CL global links number connected to routers in the same group in $G_k$ and any pair of groups in cluster $G_k$ is no more than one;

This invention proposes a partially-adaptive routing algorithm for CLHR network includes following steps:

S1: The clusters are labeled as $G_0, G_1, \ldots, G_{p-1}$ from left to right; the groups are labeled as $G_{0,i}, G_{1,i} \ldots, G_{q-1,i}$ from top to bottom in the cluster $G_i$; the routers are labeled as $R_0$, $R_1, \ldots R_{n-1}, \ldots, R_{mn-1}$ from left to right and top to bottom in a group. The above elaborates the connection rule;

S2: There are two routers at each end of the channel. A hop from $R_c \in G_{b,a}$ to $R_f \in G_{e,d}$, define minus hop and plus hop as follows:

if a>d, the hop is minus;
if a<d, the hop is plus;
if a=d and b>e, the hop is minus;
if a=d and b<e, the hop is plus;
if a=d and b=e and c>f, the hop is minus;
if a=d and b=e and c<f, the hop is plus;

S3: The routing scheme allows one or more minus hops first and then one or more plus hops after that, namely minus-first routing; or one or more plus first and one or more minus hops after that, namely plus-first routing;

In this invention embodiment, S3 adopts minus-first routing for convenience.

The partially-adaptive routing algorithm embodiment as stated in S3 contains following steps:

S31: Assume that current node is $G_aG_{b,a}R_c$, destination is $G_dG_{e,d}R_f$. The MFR algorithm checks whether current node and destination node are in the same cluster. If a=d, then step into S32; otherwise, step into S33;

S32: This step checks whether current node and destination node are in the same group. If b=e, then step into S321; if b<e, then step into S322; otherwise, step into S323;

S321: This step checks whether Rc is equal to Rf. If Rc=Rf the packet has arrived at the destination, exit; if Rc≠Rf, then deliver the packet from Rc to Rf by a local link directly;

S322: Assume that $R_v \in G_{k,a}$ is connected to $R_{v'} \in G_{e,d}$ by a GL global link. If Rf=Rv', then the packet can be delivered from $R_c$ to $R_v$ first via a plus or minus hop, and from $R_v$ to $R_{v'}$ by a plus hop, which conforms to the MFR scheme; if Rf>Rv', then the packet can be delivered along MFR hops, which is similar to above case; if Rf<Rv', then the packet need be misrouted to $G_{k,a}$. Assume that $R_{v1} \in G_{b,a}$ is connected to $R_{v'1} \in G_{k,a}$ and $R_{v2} \in G_{k,a}$ is connected to $R_{v'2} \in G_{e,d}$, the packet is misrouted to $G_{k,a}$ with b<k<e, where $R_{v'1}<R_{v'2}$ and $R_f>R_{v2}$;

S323: Assume that $R_v \in G_{k,a}$ is connected to $R_{v'} \in G_{e,d}$ by a GL global link. If c=v, then the packet can be delivered from $R_c$ to $R_{v'}$ first via a minus hop, and from $R_{v'}$ to $R_f$ by a minus or plus hop, which conforms to the MFR scheme; if c>v, then the packet can be delivered along MFR hops, which is similar to above case; if c<v, then the packet need be misrouted to $G_{k,a}$. Assume that $R_{v1} \in G_{b,a}$ is connected to $R_{v'2} \in G_{k,a}$ and $R_{v'1} \in G_{k,a}$ is connected to $R_{v'2} \in G_{e,d}$, the packet is misrouted to $G_{k,a}$ with e<k<b, where $R_{v'1}<R_{v'2}$ and v1≤c; the packet is misrouted to $G_{k,a}$ with k<e<b, where v1≤c and v2≤f;

S33: This step checks whether the group $G_{b,a}$ that contains current node is directly connected to the group $G_{e,d}$ that contains destination node. If so, then step into S331; otherwise, step into S332;

S331: Assume that $R_v \in G_{b,a}$ is connected to $R_{v'} \in G_{e,d}$ by a CL global link. The packet can be delivered to the destination along minimum path as if a minimum MFR path is available. If there is no available MFR path in the above case, the packet can be misrouted to one of the 2k-2 groups, along which a MFR path is available. Among the 2k-2 groups, the k-1 groups in $G_a$ that are connected to $G_{e,d}$, and the k-1 groups in $G_d$ that are connected to $G_{b,a}$;

S332: Find the k groups in $G_a$ that are connected to $G_{e,d}$ and the k groups in $G_d$ that are connected to $G_{b,a}$. The packet is delivered to one of the 2k groups, through which an MFR path can be found from current node to the intermediate group, and finally to the destination;

S34: If no available MFR path has been found in the above steps, then select an adaptive intermediate group. If a<d and e>0, then select $G_{e-1,d}$ as an intermediate group. If a>d and b>0, then select $G_{b-1,a}$ as an intermediate group. If a<d and e=0, then select $G_{q-1,d-1}$ as an intermediate group. If a>d and b=0, then select $G_{q-1,a-1}$ as an intermediate group;

FIGS. 3A-3D present an adaptive routing algorithm based on above the partially-adaptive routing algorithm for CLHR contains following steps:

D1: The method classifies packets as safe or unsafe: A safe packet is one that is delivered to the current router via a hop that conforms to MFR, which can reach the destination via MFR hops; otherwise, the packet is unsafe;

D2: Each input port contains buff buffers, where each buffer is enough to keep the whole packet, and buff is an integer greater than or equal to 2;

D3: Let current node is $G_aG_{b,a}R_c$, and destination node is $G_dG_{e,d}R_f$. This method checks whether cluster a is the same as the cluster d. If a=d, step into D31; otherwise, step into D32;

D31: If b=e and routing satisfies the flow control conditions, then deliver the packet from the current node to the destination via row-first or column-first minimum path routing; if b<e, then step into D311; otherwise, step into D312;

D311: Assume that $R_v \in G_{b,a}$ is connected to $R_{v'} \in G_{e,d}$ by a GL global link. If $R_f<R_{v'}$, $R_c \neq R_{v'}$, and the flow control conditions at the next hop can be satisfied, then deliver the packet to the next router as unsafe packet; if $R_f \geq R_{v'}$ and the flow control conditions can be satisfied at the next hop, then deliver the packet to the next router as safe packet;

D312: Assume that $R_v \in G_{b,a}$ is connected to $R_{v'} \in G_{e,d}$ by a GL global link. If $R_c<R_v$ and the flow control conditions at the next hop can be satisfied, then deliver the packet to the next router as unsafe packet; if $R_c \geq R_v$ and the flow control conditions at the next hop can be satisfied, then deliver the packet to the next router as safe packet;

D32: When both the current and the destination groups are directly connected, the packet is delivered to the k-1 other groups in $G_a$ that are connected to $G_{e,d}$, or other k-1 groups in $G_d$ that are connected to $G_{b,a}$. The method takes priority to selecting paths that the packet is safe when injecting the input port of the next hop. If the current and destination groups are not directly connected, the method finds the k intermediate groups in $G_d$ that are connected to the current group, and the k groups in $G_a$ that are connected to the destination group. The packet is delivered to one of the 2k groups along which the packet becomes safe as early as possible provided that the flow control conditions can be satisfied;

D4: Assume that the number of free buffer is f and the number of safe packets is s at the next router. The adaptive routing can forward a packet to the next hop if one of the following conditions can be satisfied:

if f>1, packet can be delivered to the next hop via provided channel;

if f=1 and s≥1, packet can be delivered to the next hop via provided channel;

if f=1, s=0, and the next hop conforms to MFR scheme, packet can be delivered to the next hop via provided channel;

Otherwise, the packet cannot be delivered to the next hop via provided channel;

Above is flow control scheme which is stated in the D3;

The reason why the adaptive routing algorithm of the invention can avoid deadlocks is that it adopts minus-first routing algorithm which prevents deadlocks by preventing cyclic channel dependencies.

The above mode of execution is just used for explaining this invention rather than limiting this invention. Relevant technical personnel, in not divorced from the spirit and scope of the invention, also can make all kinds of change and variant. Therefore, all equivalent technical solutions also belong to the category of the invention. The protection scope of the invention patent should be limited by claims.

What is claimed is:

1. A router chip comprising an interconnection network, comprising:
   a hierarchical network architecture (also referred to as CLHR) resided on the router chip and having four layers;
   a lowest level includes a series of routers that connect to one or more processors or servers;
   a series of nodes establish a row, and each router group has at least two rows;
   p clusters, where p is an integer greater than or equal to 2, wherein each cluster contains q groups, where q is an integer greater than or equal to 2;
   wherein each group comprises g routers that are placed in m rows, with each row containing n routers; wherein n is an integer greater than or equal to 1, m is an integer greater than or equal to 2, and g is an integer greater than or equal to 2;
   wherein the clusters are labeled as G0, G1, ..., Gp−1 from left to right; as G0,i, G1,i, ..., Gq−1,i from top to bottom in the cluster Gi; and the routers are labeled as R0, R1, ..., Rn−1, ..., Rmn−1 from left to right and top to bottom in a group;
   wherein the routers of each group are connected according to the following scheme:
   rule R1: any two nodes in a same row are connected;
   rule R2: any two nodes in a same column are connected;
   rule R3: for any adjacent row from first to last, a last node of a first row is connected to a first node of a next row;
   wherein the groups of each cluster are connected using the following scheme and by using group-level (GL) global links:
   rule G1: for i∈{0, 1, 2, ..., q−2}, a last router Rmn−1∈Gi,a is connected to a first router R0∈Gi+1,a, where a is a cluster label;
   rule G2: after any pairs of adjacent groups have been connected, any pairs of non-adjacent groups are connected by the following way; as a principle to connect Gi,a to all Gj,a with j>i for i=0 to q−3 and j=i+2 to q−1, connecting a highest available global slot in Gi,a to a lowest available slot in Gj,a;
   wherein the clusters are connected using the following scheme and by using cluster-level (CL) global links:
   rule C1: the last router Rmn−1 in a last group Gq−1,a of current cluster Ga is connected to the first router R0 in a first group G0,a+1 of next cluster Ga+1 for a=0 to p−2;
   rule C2: connect Gi,a∈Ga via the lowest available slot in Gi,a to the highest available slot in Gk with a>k for a=1 to p−1, k=0 to a−1, i=0 to q−1; there are k global links from a group in Ga to k separate groups in Gk, and the difference of the CL global links number connected to routers in the same group in Gk and any pair of groups in cluster Gk is no more than one.

2. The router chip of claim 1, further comprising: a processor configured to execute a partially-adaptive routing algorithm to determine a hop for the interconnection network comprising the following steps:
   S1: the clusters are labeled as G0, G1, ..., Gp−1 from left to right; the groups are labeled as G0,i, G1,i, ..., Gq−1,i from top to bottom in the cluster Gi; the routers in the same group are labeled as R0, R1, ..., Rn−1, Rn ..., Rmn−1 from left to right and top to bottom in a group, wherein the clusters, groups and routers are connected in the same way on a router chip as that set forth in claim 1;
   S2: according to labels of routers, or groups, or clusters at both ends of a channel, a hop can be classified as minus or plus; the hop is minus if a label of its source is greater than a destination; otherwise, the hop is plus;
   S3: the partially-adaptive routing algorithm allows one or more minus hops first and then one or more plus hops after that, namely minus-first routing; or one or more plus hop first and one or more minus hop after that, namely plus-first routing.

3. The router chip of claim 2, characterized in that, a hop is classified as minus or plus that should obey principles as follows:
   let a hop from $R_c \in G_{b,a}$ to $R_f \in G_{e,d}$,
   if a>d, the hop is minus;
   if a<d, the hop is plus;
   if a=d and b>e, the hop is minus;
   if a=d and b<e, the hop is plus;
   if a=d and b=e and c>f, the hop is minus;
   if a=d and b=e and c<f, the hop is plus.

4. The router chip of claim 2, characterized in that, the partially-adaptive routing algorithm obeys minus-first rule when forwarding packets in the step S3.

5. The router chip of claim 4, characterized in that, the partially-adaptive routing algorithm sketches step S3 which contains the following steps:
   S31: assume that a current node is $G_d G_{b,a} R_c$, destination is $G_d G_{e,d} R_f$; a Minus First Routing (MFR) algorithm checks whether the current node and the destination node are in the same cluster; if a=d, then step into S32; otherwise, step into S33;
   S32: this step checks whether the current node and the destination node are in the same group; if b=e, then step into S321; if b<e, then step into S322; otherwise, step into S323;
   S321: this step checks whether c is equal to f; if c=f, a packet has arrived at the destination, exit; if c≠f, then deliver the packet from c to f by a local link directly;
   S322: assume that $R_v E G_{b,a}$ is connected to $R_{v'} \in G_{e,d}$ by a GL global link; if f=v', then a packet can be delivered from $R_c$ to $R_v$ first via a plus or minus hop, and from $R_v$ to $R_{v'}$ by a plus hop, which conforms to the MFR algorithm; if f>v', then the packet can be delivered along MFR hops, which is similar to the case when f=v' as stated in S322; if f<v', then the packet needs to be misrouted to $G_{k,a}$. Assume that $R_{v1} \in G_{b,a}$ is connected to $R_{v'1} \in G_{k,a}$ and $R_{v2} \in G_{k,a}$ is connected to $R_{v2} \in G_{e,d}$, the packet is misrouted to $G_{k,a}$ with b<k<e, where $R_{v'1} < R_{v2}$ and $R_f > R_{v2}$;
   S323: assume that $R_v \in G_{b,a}$ is connected to $R_{v'} \in G_{e,d}$ by a GL global link; if c=v, then a packet can be delivered from $R_c$ to $R_{v'}$ first via a minus hop, and from $R_{v'}$ to $R_f$ by a minus or plus hop, which conforms to the MFR algorithm; if c>v, then the packet can be delivered along MFR hops, which is similar to the case when c=v as stated in S323; if c<v, then the packet needs to be misrouted to $G_{k,a}$. Assume that $R_{v1} \in G_{b,a}$ is connected to $R_{v2} \in G_{k,a}$ and $R_{v'1} \in G_{k,a}$ is connected to $R_{v'2} \in G_{e,d}$, the packet is misrouted to $G_{k,a}$ with e<k<b, where $R_{v'1}/<R_{v'2}$ and v1≤c; the packet is misrouted to $G_{k,a}$ with k<e<b, where v1≤c and v2≤f;

S33: this step checks whether the group $G_{b,a}$ that contains current node is directly connected to the group $G_{e,d}$ that contains destination node; if so, then step into S331; otherwise, step into S332;

S331: assume that $R_v \in G_{b,a}$ is connected to $R_{v'} \in G_{e,d}$ by a CL global link; a packet can be delivered to the destination along minimum path as if a minimum MFR path is available; if there is not an available MFR path, the packet can be misrouted to one of the 2k−2 groups, along which a MFR path is available; among the 2k−2 groups, the k−1 groups in $G_a$ that are connected to $G_{e,d}$, and the k−1 groups in $G_d$ that are connected to $G_{b,a}$;

S332: find the k groups in $G_a$ that are connected to $G_{e,d}$, and the k groups in $G_d$ that are connected to $G_{b,a}$, a packet is delivered to one of the 2k groups, through which an MFR path can be found from current node to an intermediate group, and finally to the destination;

S34: if the steps S32 or S33 did not find an available MFR path, then select an adaptive intermediate group; if a<d and e>0, then select $G_{e-1,d}$ as an intermediate group. If a>d and b>0, then select $G_{b-1,a}$ as an intermediate group; if a<d and e=0, then select $G_{q-1,d-1}$ as an intermediate group; if a>d and b=0, then select $G_{q-1,a-1}$ as an intermediate group.

6. The router chip of claim 1, further comprising: a processor configured to execute an adaptive routing algorithm for the interconnection network comprising the following steps:

D1: classifying packets as safe or unsafe, wherein if a packet is delivered to a current router via a hop that conforms to MFR algorithm and can reach a destination via MFR hops, the packet is classified as safe, and, if not, the packet is classified as unsafe;

D2: wherein each input port contains buff buffers, where each buffer is sufficient to keep the whole packet, and wherein buff is an integer greater than or equal to 2;

D3: comparing whether cluster a is the same as cluster d, and wherein if a=d, proceed to step D31, and if a does not equal d, proceed to step D32;

D31: if b=e and routing satisfies flow control conditions, delivering the packet from a current node to a destination via row-first or column-first minimum path routing, and wherein if b<e, then proceed to step D311, and otherwise proceed to step D312;

D311: wherein $R_v \in G_{b,a}$ is defined as connected to $R_{v'} \in G_{e,d}$ by a GL global link, and wherein if $R_f < R_{v'}$, $R_c \neq R_{v'}$, and routing satisfies flow control conditions, then delivering the packet to a next router as an unsafe packet, and wherein if $R_f \geq R_{v'}$ and routing satisfies flow control conditions, then delivering the packet to the next router as a safe packet;

D312: wherein $R_v \in G_{b,a}$ is defined as connected to $R_{v'} \in G_{e,d}$ by a GL global link, and wherein if $R_c < R_v$ and routing satisfies flow control conditions, then delivering the packet to the next router as an unsafe packet, and wherein if $R_c \geq R_v$ and routing satisfies flow control conditions, then delivering the packet to the next router as a safe packet;

D32: when both current and destination groups are directly connected, delivering the packet to the k−1 other groups in $G_a$ that are connected to $G_{e,d}$, or other k−1 groups in $G_d$ that are connected to $G_{b,a}$, wherein the algorithm prioritizes selecting paths that the packet is safe when injecting an input port of a next hop, wherein if the current and destination groups are not directly connected, the algorithm finds the k intermediate groups in $G_d$ that are connected to the current group, and the k groups in $G_a$ that are connected to the destination group, wherein the packet is delivered to one of the 2k groups along which the packet becomes safe as early as possible provided that the flow control conditions are satisfied;

D4: wherein a number of free buffer is defined as f, and a number of safe packets is s at the next router, wherein the adaptive routing algorithm forwards a packet to the next hop if one of the following conditions are satisfied:

if f>1, the packet is delivered to the next hop via a provided channel;

if f=1 and s≥1, the packet is delivered to the next hop via the provided channel;

if f=1, s=0, and the next hop conforms to the MFR algorithm, the packet is delivered to the next hop via the provided channel;

otherwise, the packet is not delivered to the next hop via the provided channel.

* * * * *